United States Patent
Yeh et al.

(10) Patent No.: US 9,134,845 B2
(45) Date of Patent: Sep. 15, 2015

(54) METHOD FOR MULTI-TOUCH CONTROL AND ASSOCIATED APPARATUS

(75) Inventors: Ting-Hao Yeh, Hsinchu (TW); Guo-Kiang Hung, New Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 345 days.

(21) Appl. No.: 13/419,523

(22) Filed: Mar. 14, 2012

(65) Prior Publication Data

US 2012/0235936 A1  Sep. 20, 2012

(30) Foreign Application Priority Data

Mar. 15, 2011  (TW) .............................. 100108837 A

(51) Int. Cl.
- *G06F 3/041* (2006.01)
- *G06F 3/044* (2006.01)

(52) U.S. Cl.
CPC .............. *G06F 3/0416* (2013.01); *G06F 3/044* (2013.01); *G06F 2203/04104* (2013.01)

(58) Field of Classification Search
None
See application file for complete search history.

(56) References Cited

U.S. PATENT DOCUMENTS

| | | | |
|---|---|---|---|
| 5,825,352 A | 10/1998 | Bisset et al. | |
| 2008/0042992 A1* | 2/2008 | Kim | 345/173 |
| 2010/0193258 A1 | 8/2010 | Simmons et al. | |
| 2011/0148820 A1* | 6/2011 | Song | 345/175 |
| 2011/0187653 A1* | 8/2011 | Ko et al. | 345/173 |
| 2011/0210943 A1* | 9/2011 | Zaliva | 345/174 |
| 2011/0216038 A1* | 9/2011 | Stolov et al. | 345/174 |
| 2011/0234508 A1* | 9/2011 | Oda et al. | 345/173 |

FOREIGN PATENT DOCUMENTS

| | | |
|---|---|---|
| CN | 101387927 A | 3/2009 |
| CN | 101689089 A | 3/2010 |
| CN | 101782826 A | 7/2010 |
| TW | 1269997 | 1/2007 |

OTHER PUBLICATIONS

Chinese Office Action dated Aug. 19, 2014, 10 pages.

* cited by examiner

*Primary Examiner* — Adam R Giesy
*Assistant Examiner* — Henok Heyi
(74) *Attorney, Agent, or Firm* — Edell, Shapiro & Finnan, LLC

(57) ABSTRACT

A method for multi-touch control and associated apparatus is provided. The method includes indentifying two peak sensing values from a plurality of sensing values of a touch panel, providing a threshold according to intrinsic characteristics of the touch panel and features of the sensing values, comparing whether the sensing values between the two peak sensing values are lower than the threshold, and selectively reporting multi-touch events.

16 Claims, 8 Drawing Sheets

METHOD FOR MULTI-TOUCH CONTROL AND ASSOCIATED APPARATUS

This application claims the benefit of Taiwan application Serial No. 100108837, filed Mar. 15, 2011, the subject matter of which is incorporated herein by reference.

BACKGROUND OF THE INVENTION

1. Field of the Invention

The invention relates in general to a method for multi-touch control and associated apparatus, and more particularly to a method for multi-touch control free from erroneously reporting multi-touch events and associated apparatus.

2. Description of the Related Art

The touch control technology brings people a user-friendly, intuitive and easy-to-use user interface, and is thus one of the most prevailing human-machine interface (HMI) technologies. In touch control, a touch panel senses a coordinate position touched by a touching object, e.g., a user finger, to accordingly acquire a manipulation desired by a user. It is important to correctly determine whether a user touch is a single-touch or multi-touch event in order to analyze the desired user manipulation according to processing rules respectively corresponding to a single-touch event and a multi-touch event.

Hence, there is a need for a touch control technique capable of correctly identifying multi-touch events.

SUMMARY OF THE INVENTION

The present invention discloses a method for multi-touch control comprises steps of: sensing a plurality of sensing values corresponding to different coordinate positions associated with a sensing panel, and identifying two peak sensing values from the sensing values; providing a threshold, determining by comparison whether the sensing values between the two peak sensing values are lower than the threshold to generate a comparison result, and selectively reporting a multi-touch event according to the comparison result. For example, when the sensing values between the two peak sensing values are not lower than the threshold, no multi-touch event is reported; when one of the sensing values between the two peak sensing values is lower than the threshold, a multi-touch event is reported.

Preferably, the threshold is determined according to a difference between coordinate positions corresponding to the two peak sensing values or magnitudes of the sensing values. Alternatively, the threshold is determined according to two group sensing values respectively obtained according to the two peak sensing values and neighboring sensing values, so that the threshold is associated with the difference between the coordinate positions of the two peak sensing values and/or the magnitudes of the two group sensing values. To calculate a group sensing value corresponding to one peak sensing value, the peak sensing value and an appropriate number of neighboring sensing values are grouped as one according to variances (e.g., a slope) between the peak sensing value and its neighboring sensing values, so that the group sensing value represents the sensing values of a region touched by a touching object. According to the group sensing values calculated from the sensing values, a total sensing value incurred on the touch panel by the touching object can be obtained.

For example, the threshold is associated with characteristics of the touch panel, e.g. a stacked structure of the touch panel, or shapes and positions of the sensing electrodes. The capacitance touch panel may be formed by stacking a cover lens, a sensing electrode layer, a substrate layer and a common voltage layer. The cover lens is non-conductive, the sensing electrode layer and the common voltage layer are formed by a conductive material, and the sensing electrodes are distributed/formed on the sensing electrode layer. A magnitude of threshold is affected by thicknesses and dielectric constants of the layers as well as spaced distances between the layers.

Preferably, an electromagnet simulation is applied to provide a reliable threshold. According to a stacked structure and a predetermined touching object in a predetermined size, a sensing value incurred on the stacked structure by the touching object is simulated to obtain corresponding expected sensing value and expected sensing value distribution. The expected sensing distribution indicates an overall pattern of the expected sensing value corresponding to changes in coordinate positions. Thus, an added sensing value distribution of two predetermined touching objects at various distances may be deduced according to the predetermined touching object and its corresponding expected sensing value distribution. Thus, a touch resolution distance is obtained according to the expected sensing value of the predetermined touching object.

For the touch resolution distances of the two predetermined touching objects, the sensing values sensed by the sensing electrodes are respectively calculated according to shapes and positions of the sensing electrodes as well as the expected sensing value distribution of the predetermined touching object. Under such conditions, two peak values are analyzed by the sensing distribution, and a valley sensing value between the two peak values is obtained to accordingly determine a corresponding expected valley sensing value. For a predetermined touching object with a constant size, a corresponding expected valley sensing value is obtained. Similarly, expected sensing values and expected sensing value distributions corresponding to a plurality of differently sized predetermined touching objects (e.g., conducting pillars with different diameters) are respectively simulated, and corresponding touch resolution distances and expected valley sensing values are obtained.

Preferably, two peak sensing values (and/or group sensing values) sensed by a touch panel are compared with expected sensing values of predetermined touching objects. Since sizes of the predetermined touching objects are known, it is inferred that a size of an actual touching object approaches that of a matching predetermined touching object when the peak sensing value/group sensing value matches the expected sensing value/sensing value distribution of the predetermined touching object, e.g. with a difference between each other being smaller than a tolerable value. Hence, the threshold may be determined according to the expected valley sensing value corresponding to the matching predetermined touching object.

Preferably, a curve is provided by curve fitting according to the sizes of the different touching objects and corresponding expected valley values. When the size of the actual touching object is determined, the corresponding expected valley value is calculated according to the curve to accordingly determine the threshold.

The curve includes one or several intervals, each of which corresponds to an expected valley sensing value (or a threshold). A look-up table may be implemented to store the threshold(s). For example, one or several sensing value intervals are provided, each providing a corresponding expected valley value (or a corresponding threshold). Upon obtaining the peak sensing values/group sensing values from the actually sensed sensing values for comparison, a matching sensing value interval may be identified from the peak values/group sensing values, so as to determine the threshold according to the expected valley sensing value (or the threshold) corresponding to the matching sensing value interval.

The present invention also discloses a multi-touch control apparatus is provided. The multi-touch control apparatus, coupled to a touch panel, comprises a peak value identification module, a threshold module, a comparison module and a reporting module for realizing touch control in conjunction with a touch panel. The touch panel senses to provide a plurality of sensing values. The peak identification module identifies two peak values from the sensing values. The threshold module provides a threshold. The comparison module compares the sensing values between the two peak values with the threshold to generate a comparison result. The reporting module selectively reports a multi-touch control event according to the comparison result of the comparison module.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
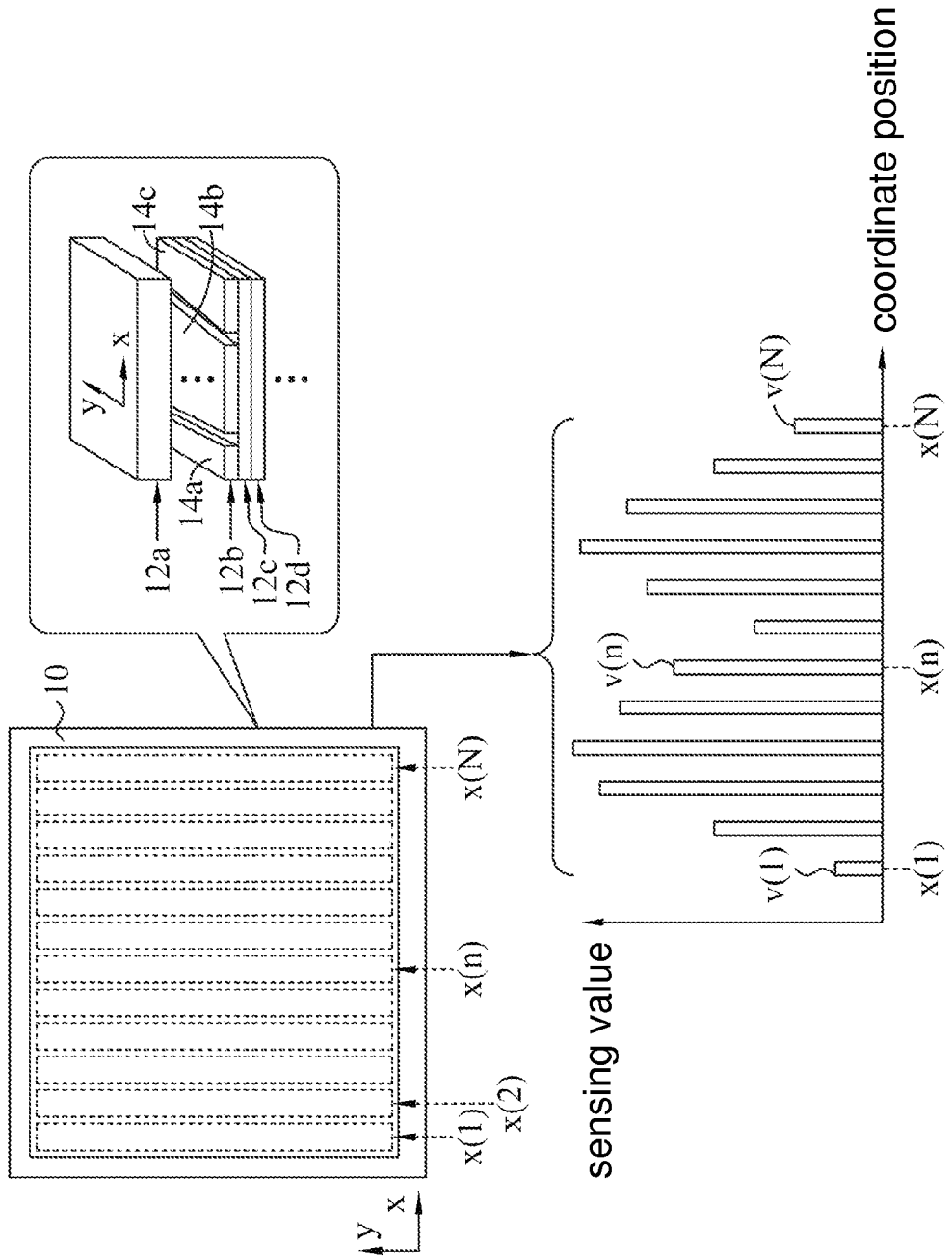
FIG. 1 is a diagram of a touch panel and sensing values provided by the touch panel.

FIG. 1 shows a diagram of a touch panel 10 for touch control. The touch panel 10 capable of touching sensing respectively provides sensing values $v(1)$, $v(2)$, ... $v(n)$ to $v(N)$ for coordinate positions $(x(1), x(2), ... x(n)$ to $x(N)$ of an xy plane. For example, the touch panel 10 is a capacitive touch panel, and is formed by a multi-layered stacked structure parallel to the xy plane. The stacked structure comprises a cover lens 12a, a sensing electrode layer 12b, a substrate layer 12c, and a common voltage layer 12d. The cover lens 12a formed by a non-conductive dielectric material is covered on the conductive sensing electrode layer 12b, and the substrate layer 12c is stacked below the sensing electrode layer 12b and above the common voltage layer 12d. The common voltage layer 12d is a conductive plane extended along the xy plane.

The sensing electrode layer 12b comprises a plurality of sensing electrodes, e.g., sensing electrodes 14a, 14b and 14c. When a touching object, e.g., a user finger, approaches the sensing electrodes, equivalent capacitance of the sensing electrodes is changed. A change in the equivalent capacitance can be measured, and the capacitance sensing value $v(n)$ corresponding to the coordinate position $x(n)$ indicates the equivalent capacitance change of the corresponding sensing electrode. For example, a corresponding sensing value gets greater as a touched position gets nearer to a coordinate position.

Figure 2:
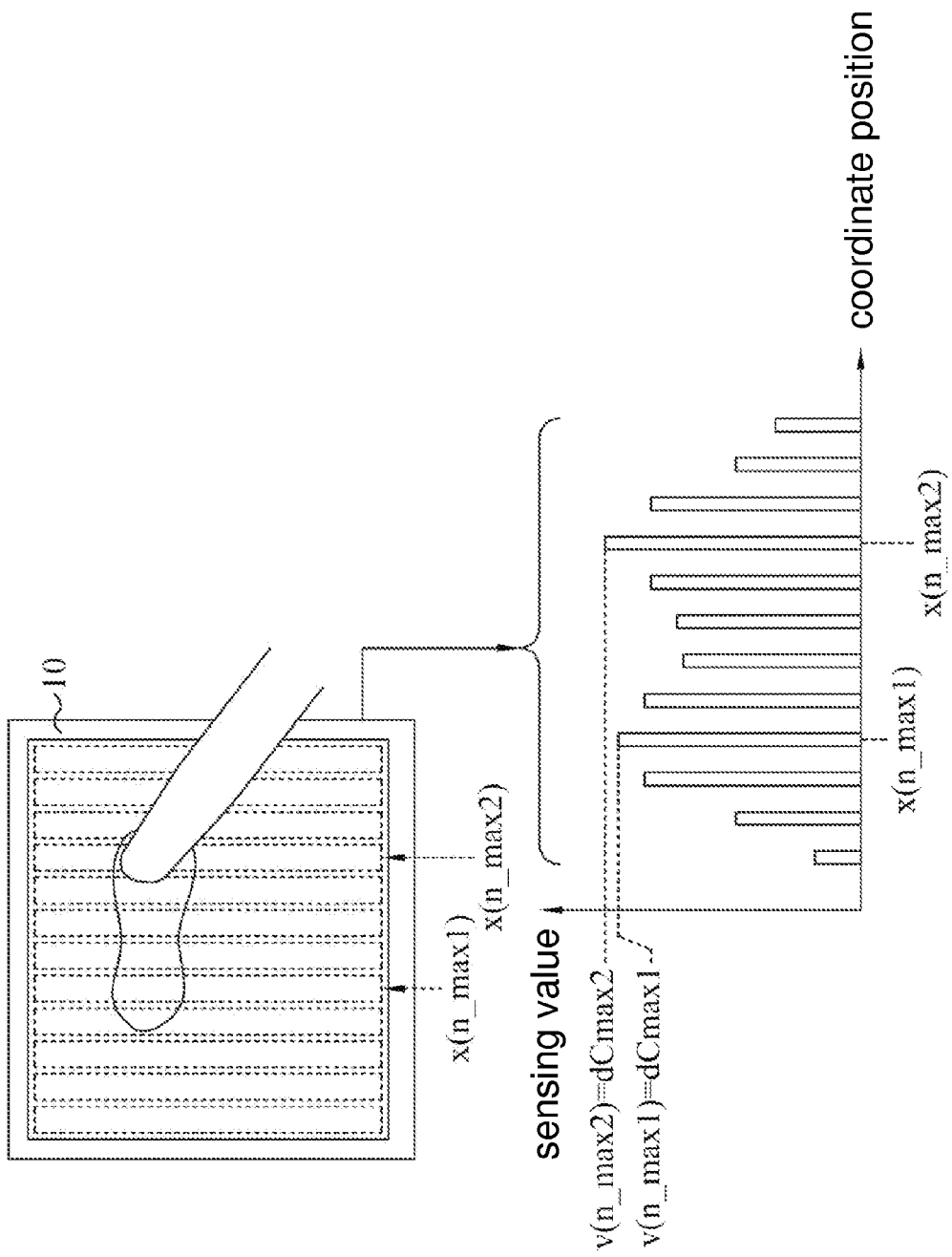
FIG. 2 is a diagram of a single-touch event being mistakenly determined as a multi-touch event.

Ideally, a coordinate position $x(n\_max)$ corresponding to a peak sensing value $v(n\_max)$ corresponds to a user touched position when the sensing value $v(n\_max)$ from the sensing values $v(1)$ to $v(N)$ is identified by comparison as the peak sensing value. When touch control is performed by multiple fingers, several corresponding peak values from the sensing values $v(1)$ to $v(N)$ are resulted. However, the occurrence of several peak values from the sensing values $v(1)$ and $v(N)$ does not necessarily mean that a multi-touch control is performed. FIG. 2 shows a diagram illustrating several peak values in the sensing values occur although only a single-touch control is performed. For example, assume that high humidity is present or water drops are accumulated on the touch panel 10. When a user finger moves from a coordinate position $x(n\_max1)$ to a coordinate position $x(n\_max2)$ and passes the water drops along the way, the water drops are extended on the touch panel 10. The extended water drops similarly trigger the equivalent capacitance of the sensing electrode to change such that two peak sensing values $v(n\_max1)$ and $v(n\_max2)$ in the sensing values $v(1)$ to $v(N)$ are resulted, with respective values being dCmax1 and dCmax2. Supposing a multi-touch event is determined solely based on peak sensing values, the single-touch event in FIG. 2 is then erroneously reported as a multi-touch event.

Figure 3:
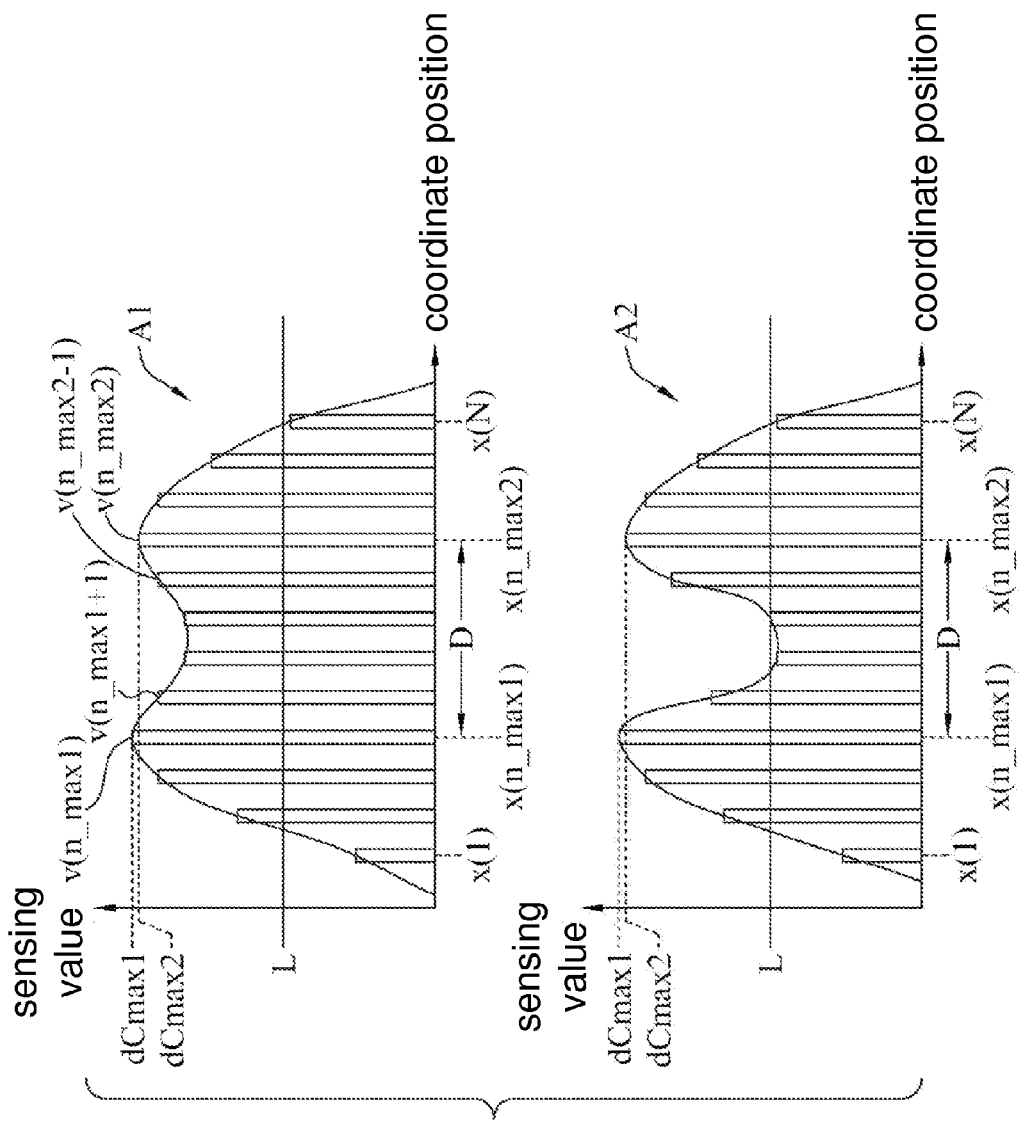
FIGS. 3 and 4 show diagrams of identifying a multi-touch event according to an embodiment of the present invention.
Figure 4:
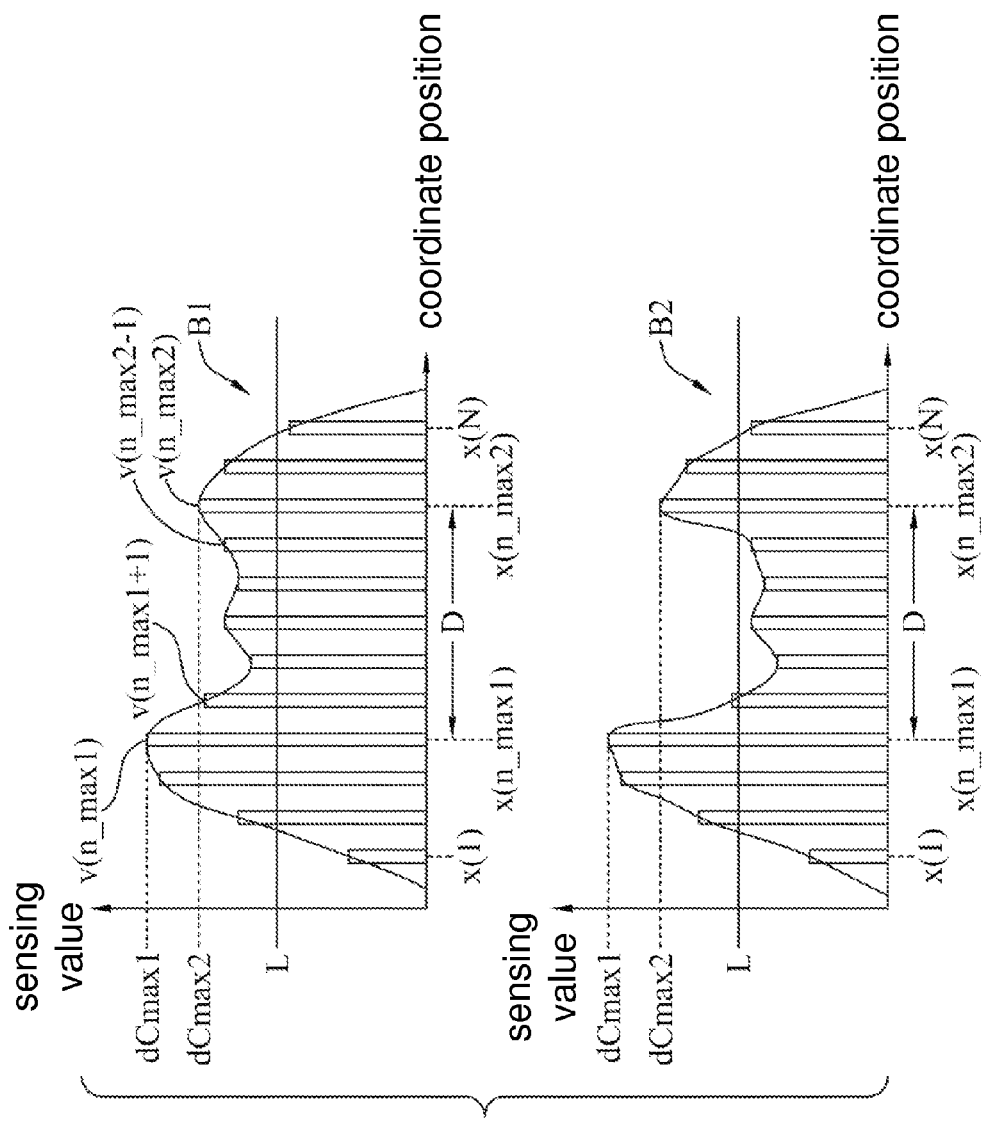

FIGS. 3 and 4 show diagrams of identifying a multi-touch event according to an embodiment of the present invention. To identify a multi-touch event by utilizing the sensing values $v(1)$ to $v(N)$, two peak sensing values $v(n\_max1)$ and $v(n\_max2)$ are identified from the sensing values, and the sensing values between the two peak sensing values, e.g., $v(n\_max1+1)$ to $v(n\_max2-1)$, are compared with a threshold L to selectively report a multi-touch event according to the comparison result. For example, when the sensing values between the two peak sensing values $v(n\_max1)$ and $v(n\_max2)$ are not lower than the threshold L, the user touch is determined as a non multi-touch event and no multi-touch event is reported. Conversely, when one or more sensing values between the two peak sensing values $v(n\_max1)$ and $v(n\_max2)$ are lower than the threshold L, the user touch is determined as a multi-touch event, which is thus reported.

For example, in an example A1 illustrated in FIG. 3, the sensing values between the two peak sensing values $v(n\_max1)$ and $v(n\_max2)$ are higher than the threshold L, so the user touch is determined as a non multi-touch event. Conversely, in an example A2, one sensing value between the two peak sensing values $v(n\_max1)$ and $v(n\_max2)$ is lower than the threshold L, so the user touch is determined as a multi-touch event.

Similarly, in an example B1 illustrated in FIG. 4, the sensing values between the two peak sensing values $v(n\_max1)$ and $v(n\_max2)$ are higher than the threshold L, the user touch is determined as a non multi-touch event so that no multi-touch event is reported. Conversely, in an example A2, several sensing values between the two peak sensing values $v(n\_max1)$ and $v(n\_max2)$ are lower than the threshold L, so the user touch is determined as a multi-touch event.

Figure 5:
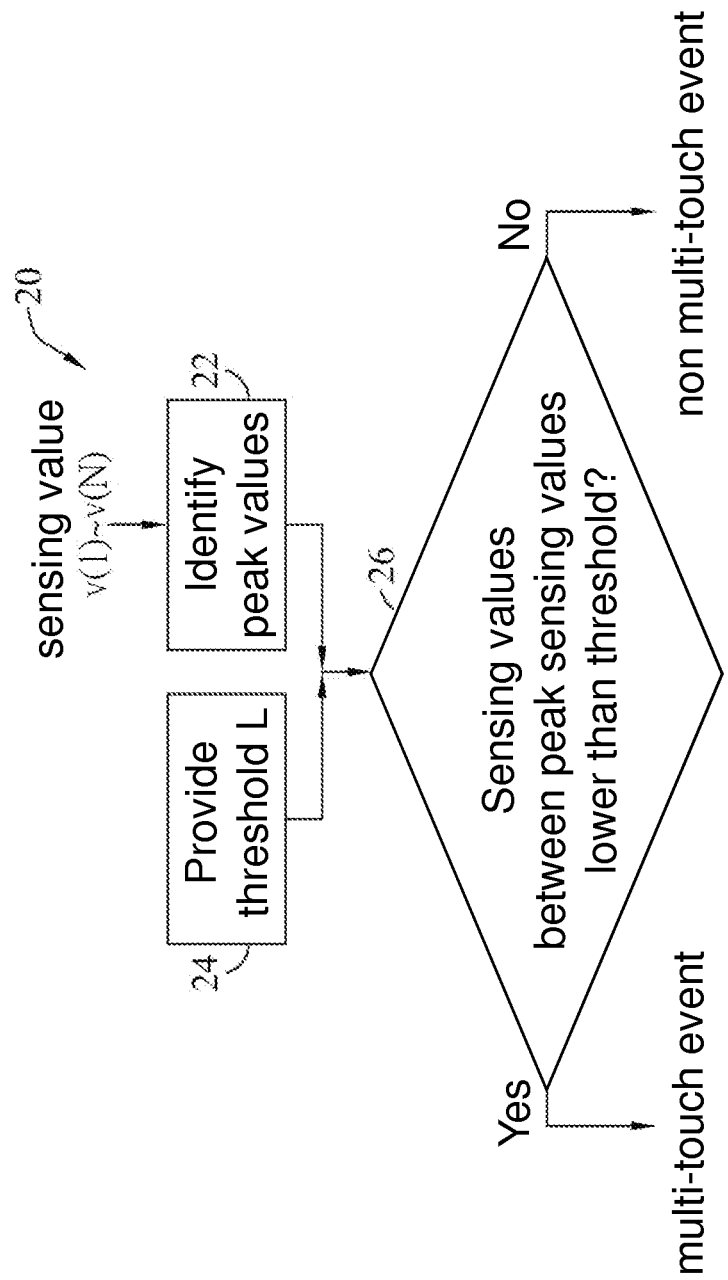
FIG. 5 is a flowchart of touch control according to an embodiment of the present invention.

FIG. 5 shows a flowchart 20 of a method for identifying a multi-touch control according to an embodiment of the present invention. In Step 22, the two peak sensing values $v(n\_max1)$ and $v(n\_max2)$ as shown in FIG. 3 or FIG. 4 are identified from the sensing values $v(1)$ to $v(N)$ provided by the touch panel 10. For example, the peak sensing values are identified according to slopes of the sensing values and/or whether the sensing values are greater than a peak determination level. In Step 24, the threshold L is provided; principles of providing the threshold L shall be further described later. In Step 26, the sensing values between the two peak sensing values v(n_max1) and v(n_max2) are compared with the threshold L to selectively report a multi-touch event according to a comparison result.

As updating the sensing values, the flow 20 are iterated to continuously identify whether a multi-touch event exists between the coordinate positions x(1) to x(N).

In one embodiment, the threshold is associated with the magnitude of the peak values and a difference between corresponding coordinate positions. For example, when values of the peak sensing values v(n_max1) and v(n_max2) respectively occurring at coordinate positions x(n_max1) and x(n_max2) are respectively dCmax1 and dCmax2, the threshold is a function of the peak values dCmax1 and dCmax2 as well as a coordinate position difference D, where D=|x(n_max1)−x(n_max2)|.

In another embodiment, a corresponding group sensing value may be first calculated for the peak sensing values, respectively, which are then referenced to determine the threshold. For example, when a peak sensing value v(n_max) is identified, its neighboring sensing values v(n_max−n1) to (n_max+n2) can be utilized to calculate a group sensing value. The values n1 and n2 may be determined according to slopes near the peak sensing value v(n_max). Since a touch object may cover several different coordinate positions to correspondingly reflect to different sensing values, a total sensing value covered by the touching object can be represented by the group sensing value. Preferably, the threshold L can be determined by the group sensing values associated with the peak sensing values.

Figure 6:
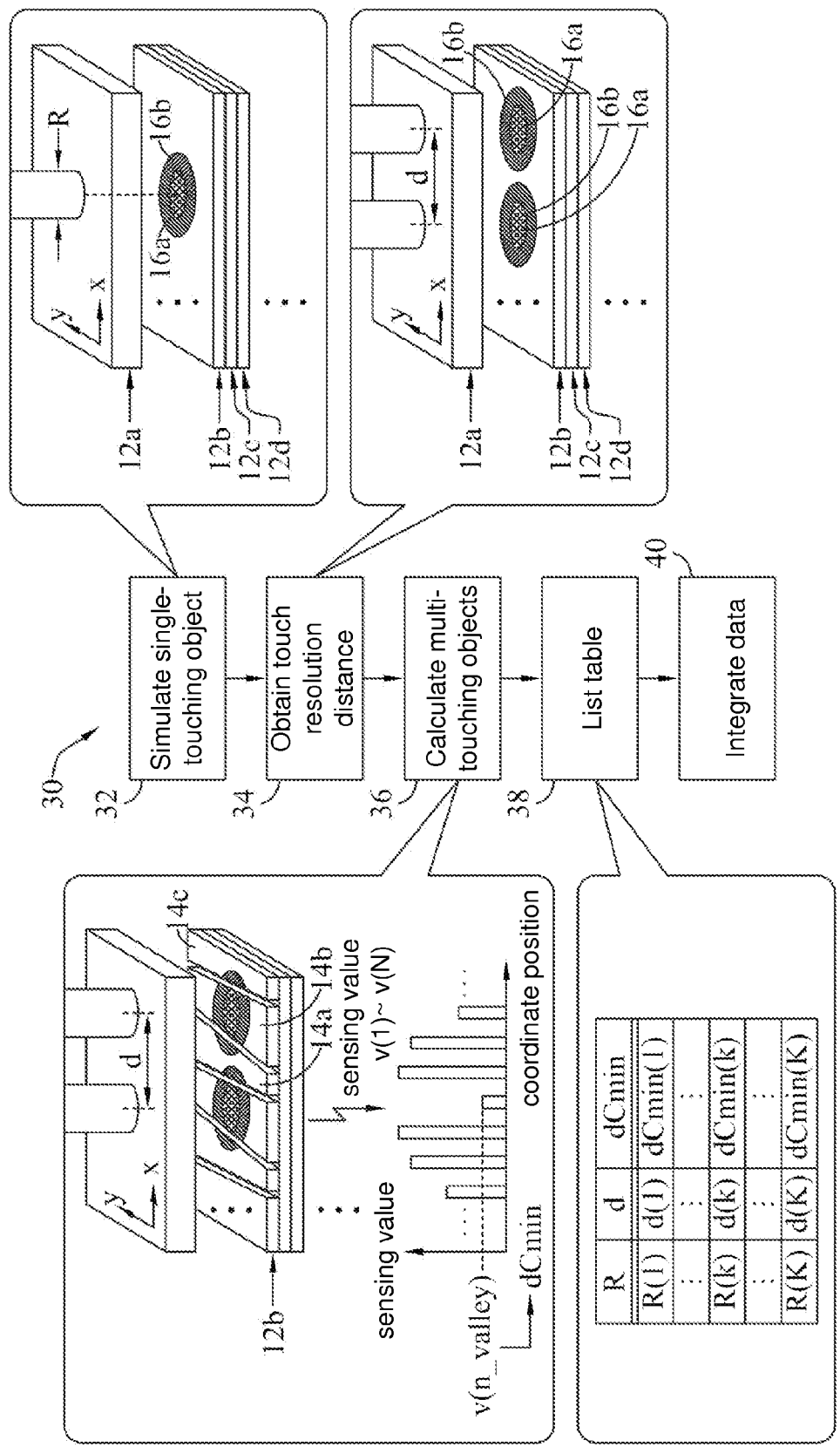
FIG. 6 is a flowchart for determining a threshold according to an embodiment of the present invention.

FIG. 6 shows a flowchart 30 of a method for determining characteristics of the touching panel 10 and features of touch control according to an embodiment of the present invention.

In Step 32, a sensing value incurred at a stacked structure of the touch panel by one touching object is simulated. According to characteristics of the stacked structure of the touch panel 10, e.g., thicknesses and dielectric constants of the layers, the sensing value distribution incurred at the sensing electrode layer 12 by a predetermined touching object having a predetermined size, e.g., simulating a finger using a conductive pillar with a diameter R, is calculated by a two-dimensional or three-dimensional electromagnetic simulation, e.g., finite element method. For example, ranges 16a and 16b are defined by the sensing value distribution. The sensing value attenuates outwards from the range 16a to the range 16b. The sensing value outside the range 16a is lower than a maximum by 30%, and the sensing value outside the range 16b is attenuated to very small values to approximate zero.

In Step 34, a synthesized sensing value distribution of two identical predetermined touching objects at various distances is inferred according to a predetermined touching object and its corresponding sensing value distribution, e.g., the range 16b. Only one peak value is present in the sensing value distribution when the two touching objects are located too closely to each other. Two peak values will be present from the sensing value distribution as a distance between the two touching objects gets larger. Therefore, a touch resolution distance d is obtained according to an expected sensing value distribution of the touching object to represent a minimum distance allowed for two peak values to be present in the sensing value distribution.

In Step 36, with the touch resolution distance of the two predetermined touching objects, the sensing values sensed by the sensing electrodes are respectively calculated according to shapes and positions of the sensing electrodes (e.g., 14a to 14c) as well as the expected sensing value distribution of the predetermined touching objects, so as to further calculate the sensing values v(1) to v(N) corresponding to the coordinate positions x(1) to x(N). Two peak values and a valley sensing value v(n_valley) between the two peak sensing values are analyzed from the sensing value distribution of the sensing values v(1) to v(N) to accordingly determine a corresponding valley sensing value dCmin. That is, for a predetermined touching object having a predetermined size, e.g., with a diameter R, a corresponding expected valley sensing value dCmin is obtained by performing Steps 32 to 36. From Steps 32 to 36, the expected valley sensing value dCmin represents a reasonable valley value of two touching objects, e.g., two fingers, located at a reasonable distance from each other. When the sensing values between the two peak sensing values from the sensing values v(1) to v(N) are not lower than the valley sensing value, it is determined that no multi-touch event takes place. It is also appreciated from Steps 32 to 36 that, the expected valley sensing value is associated with various characteristics of the touch panel 10, including thicknesses and dielectric constants of the stacked structure as well as geometric shapes and distributions of the sensing electrodes.

In Step 38, in response to differently sized touching objects, Steps 32 to 36 are iterated for a plurality of differently sized predetermined touching objects, e.g., a plurality of conductive pillars having different diameters, to respectively simulate corresponding expected sensing values and expected sensing value distributions, and to obtain corresponding touch resolution distances and expected valley sensing values. For example, a pillared touching object with a diameter R(1) corresponds to touch resolution distance d(1) and an expected valley sensing value dCmin(1), a pillared touching object with a diameter R(k) corresponds to a touch resolution distance d(k) and an expected valley sensing value dCmin(k), and so forth. Therefore, K sets of data are obtained for pillared touching objects respectively with diameters from R(1) to R(k) by performing Steps 32 to 36 K times.

In Step 40, the data obtained in Step 38 is integrated. For example, curve fitting is performed on a size (diameters R(k)) of a predetermined touching objects and a corresponding expected valley sensing value dCmin(k) to obtain a curve, and the threshold L is then determined according to the fitting curve.

Figure 7:
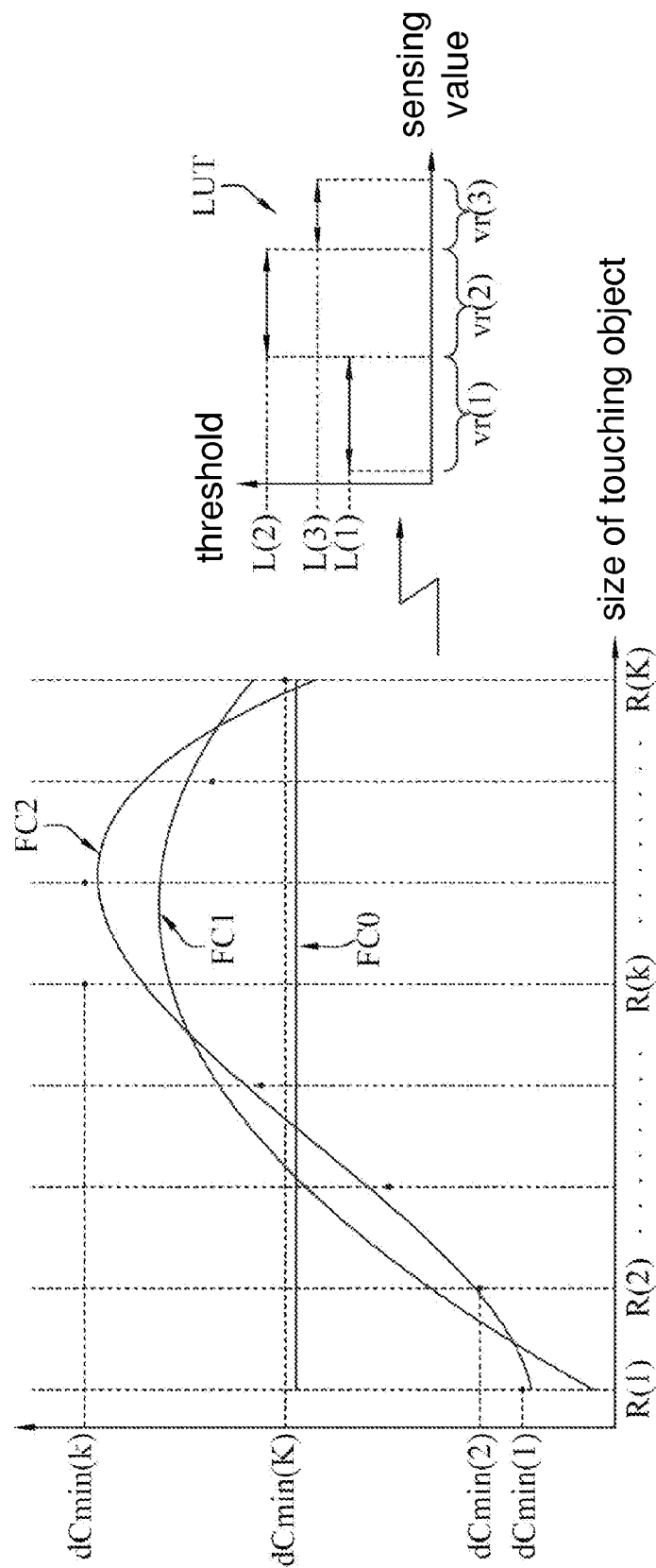
FIG. 7 is a flowchart for providing a threshold according to an embodiment of the present invention.

FIG. 7 shows a diagram of performing curve fitting on K sets of data (R(k), dCmin(k)), wherein k is an integer between 1 to K. A curve FC1 is obtained according to quadratic polynomial simulation, a curve FC2 is obtained according to cubic polynomial simulation, and a curve FC0 is obtained by simulating the K sets of data as a constant.

By referencing the curve, e.g., one of the curves FC0 to FC2, obtained from Step 40, the threshold can be determined according to the peak sensing values v(n_max1) and v(n_max2) and/or corresponding group sensing values as described in Step 24 of the flow 20 in FIG. 5. A size of an actual touching object can be inferred from the peak sensing values/group sensing values and is substituted into the curve in FIG. 7, so that the expected valley sensing value corresponding to the size can be obtained to serve as the threshold L. In this embodiment, since the size of the predetermined touching object is known, the size of the actual touching object approaches that of the predetermined touching object supposing the sensed peak sensing values/group sensing values match or approximate the expected sensing values/group sensing values of the predetermined touching object, e.g. with a difference between the two being a tolerable value. Therefore, the threshold can be determined according to the expected valley sensing value corresponding to the matching predetermined touching object.

In one embodiment, the data sets/curves in FIG. 7 include several sensing value intervals, which respectively correspond to the expected valley sensing values or the thresholds, so that the thresholds can be determined by a look-up table (LUT). For example, the LUT in FIG. 7 includes sensing value intervals vr(1) to vr(3) to the thresholds L(1) to L(3). When peak sensing values/group sensing values are obtained from actually sensed sensing values, the peak sensing values/group sensing values are compared among the sensing value intervals vr(1) to vr(3) to identify a matching sensing value interval from the sensing value intervals vr(1) to vr(3), so as to determine the expected valley sensing value of the threshold corresponding to the matching sensing value interval. For example, when the peak sensing values and/or group sensing values fall within the sensing value interval vr(2), the threshold L(2) corresponding to the sensing value interval vr(2) then serves as the threshold L in FIG. 24. In another embodiment, the LUT comprises only one sensing value interval; that is, similar to the curve FC0, the threshold L is set as a constant.

Figure 8:
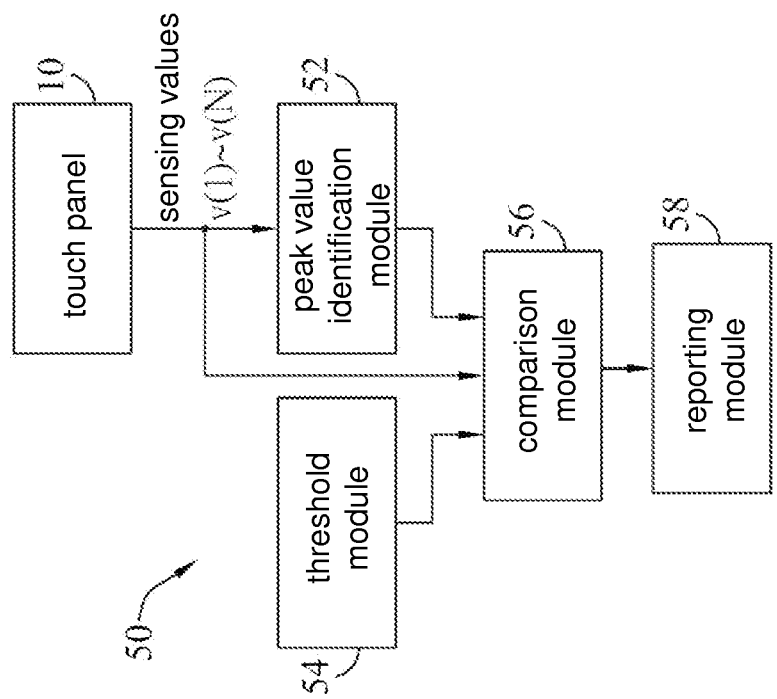
FIG. 8 is a touch control apparatus according to an embodiment of the present invention.

FIG. 8 is a block diagram of a touch control apparatus 50 according to an embodiment of the present invention. For example, the touch control apparatus 50 is a touch control controller. The touch control apparatus 50 comprises a peak value identification module 52, a threshold module 54, a comparison module 56, and a reporting module 58. The peak value identification module 52 receives from the touch panel 10 sensing values v(1) to v(N), and from which identifies two peak sensing values v(n_max1) and v(n_max2). The threshold module 54 provides the threshold L according to principles illustrated in FIG. 7. The comparison module 56 determines by comparison whether the sensing values between the two peak sensing values v(n_max1) and v(n_max2) are lower than the threshold L to generate a comparison result, based on which the reporting module 58 selectively reports a multi-touch event. The touch control apparatus 50 may be implemented by a microcontroller or a microprocessor, and realizes functions of its various modules by firmware, software or hardware approaches.

To sum up, during a multi-touch control identification process according to the present invention, a reliable threshold L is provided according to characteristics of a touch panel and features of touch control, including peak sensing values/group sensing values/sizes of touching objects obtained by touching sensing values, and a multi-touch event is identified by determining whether sensing values between peak sensing values are lower than the threshold L. Thus, the present invention is capable of minimizing misjudgment and misreports of multi-touch events and optimizing correctness as well as the water-proof feature of touch control.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-touch control method, comprising:
    sensing a plurality of sensing values associated with a touch panel;
    providing a threshold;
    identifying two peak sensing values from the plurality of sensing values;
    comparing each of the sensing values located between the two peak sensing values with the threshold to generate a comparison result; and
    selectively reporting a multi-touch event according to the comparison result,
    wherein no multi-touch event is reported when the sensing values between the two peak sensing values are not lower than the threshold, and
    wherein the multi-touch event corresponding to the two peak sensing values is reported when at least one of the sensing values between the two peak sensing values is lower than the threshold.

2. The method according to claim 1, wherein the sensing values respectively correspond to a plurality of coordinate positions.

3. The method according to claim 1, wherein the step of providing the threshold provides the threshold according to a difference between coordinate positions corresponding to the two peak sensing values.

4. The method according to claim 1, wherein the step of providing the threshold provides the threshold according to magnitudes of the two peak sensing values.

5. The method according to claim 1, wherein the step of providing the threshold comprises:
    providing two group sensing values according to the two peak sensing values and a plurality of neighboring sensing values; and
    providing the threshold according to magnitudes of the two group sensing values.

6. The method according to claim 1, wherein the touch panel comprises a plurality of sensing electrodes, and the step of providing the threshold provides the threshold according to shapes and positions of the sensing electrodes.

7. The method according to claim 1, wherein the touch panel comprises a stacked structure and the step of providing the threshold provides the threshold according to the stacked structure and a sensing value triggered at the stacked structure by a predetermined touching object.

8. The method according to claim 7, wherein the touch panel further comprises a plurality of sensing electrodes, and the step of providing the threshold comprises:
    providing an expected sensing value distribution according to the sensing value incurred at the stacked structure by the predetermined touching object;
    providing a touch resolution distance according to the expected sensing value distribution; and
    providing the threshold according to the touch resolution distance, the expected sensing value distribution, and shapes and position distributions of the sensing electrodes.

9. The method according to claim 1, wherein the touch panel comprises a stacked structure and a plurality of sensing electrodes, and the step of providing the threshold comprises:
    providing a plurality of expected sensing value distributions according to sensing values incurred at the stacked structure by a plurality of predetermined touching objects, respectively;
    providing a plurality of corresponding touch resolution distances according to the expected sensing value distributions, respectively;
    providing a plurality of corresponding expected valley sensing values according to the expected sensing value distributions, the corresponding touch resolution distance, and shapes and position distributions of the sensing electrodes, respectively; and providing the threshold according to the expected sensing value distributions and the expected valley sensing values.

10. The method according to claim 9, wherein the predetermined touching objects are differently sized.

11. The method according to claim 9, wherein the step of providing the threshold further comprises:
   comparing the two peak sensing values with the sensing values incurred at the touch panel by the predetermined touching objects to generate a comparison result; and
   providing the threshold according to the comparison result and the expected valley sensing values of the predetermined touching objects.

12. The method according to claim 9, wherein the step of providing the threshold further comprises:
   performing curve fitting according to sizes of the predetermined touching objects and the valley sensing values to provide a curve; and
   providing the threshold according to the curve.

13. The method according to claim 1, wherein the step of providing the threshold further comprises:
   providing a predetermined number of sensing value intervals;
   providing a plurality of expected value sensing values corresponding to the sensing value intervals, respectively;
   providing two group sensing values according to the two peak sensing values and a plurality of sensing values among the sensing values neighboring to the two peak sensing values;
   comparing the two group sensing values with the predetermined number of sensing value intervals, and identifying a matching sensing value interval from the predetermined number of sensing value intervals; and
   providing the threshold according to the matching sensing value interval and the corresponding expected valley sensing value.

14. A multi-touch control apparatus, coupled to a touch panel, comprising:
   a peak value identification module, for receiving a plurality of sensing values sensed by the touch panel, and identifying two peak sensing values from the sensing values;
   a comparison module, for comparing each of the sensing values located between the two peak sensing values with a threshold to generate a comparison result; and
   a reporting module, for selectively reporting a multi-touch event according to the comparison result,
   wherein the reporting module reports no multi-touch event when the comparison module determines by comparison that the sensing values between the two peak sensing values are not lower than the threshold, and
   wherein the reporting module reports the multi-touch event, which corresponds to the two peak sensing values, when the comparison module determines by comparison that at least one of the sensing values between the two peak sensing values is lower than the threshold.

15. The multi-touch control apparatus according to claim 14, further comprising a threshold module for providing the threshold.

16. The multi-touch control apparatus according to claim 14, wherein:
   the peak value identification module respectively provides two group sensing values according to the two peak sensing values and the sensing values neighboring to the two peak sensing values; and
   the threshold module provides a predetermined number of sensing value intervals, and a plurality of corresponding expected valley sensing values for the predetermined number of sensing values, respectively; compares the two group sensing values with the predetermined number of sensing value intervals to identify a matching sensing value interval; and provides the threshold according to the corresponding expected valley sensing value of the matching sensing value interval.

* * * * *